United States Patent [19]

Tauster et al.

[11] Patent Number: 4,939,113
[45] Date of Patent: Jul. 3, 1990

[54] HYDROGEN SULFIDE SUPPRESSING CATALYST SYSTEM USING AN OXIDE OF COPPER, MANGANESE, NICKEL OR IRON

[75] Inventors: Samuel Tauster, Englishtown; Lawrence Murrell, South Plainfield; Charles R. Penquite, Holmdel; Joseph C. Dettling, Howell, all of N.J.

[73] Assignee: Engelhard Corporation, Edison, N.J.

[21] Appl. No.: 116,598

[22] Filed: Nov. 3, 1987

[51] Int. Cl.$^5$ .............. B01J 23/40; B01J 23/64; B01J 23/72; B01J 23/89
[52] U.S. Cl. .............. 502/251; 502/303; 502/304; 502/324; 502/326; 502/328; 502/331; 423/213.5
[58] Field of Search .............. 502/331, 251, 303, 304, 502/324, 326, 328; 422/180; 423/213.5

[56] References Cited

U.S. PATENT DOCUMENTS

| | | | |
|---|---|---|---|
| 3,397,154 | 8/1968 | Talsma | 252/463 |
| 3,947,380 | 3/1976 | Whelan | 252/462 |
| 3,990,995 | 11/1976 | McArthur | 502/207 |
| 3,993,572 | 11/1976 | Hindin | 252/462 |
| 4,171,287 | 10/1979 | Keith | 252/462 |
| 4,374,103 | 2/1983 | Gandhi et al. | 502/313 X |
| 4,448,756 | 5/1984 | Hammerle et al. | 502/339 X |
| 4,552,733 | 11/1985 | Thompson et al. | 423/213.5 |

FOREIGN PATENT DOCUMENTS

| | | |
|---|---|---|
| 0119715 | 9/1984 | European Pat. Off. . |
| 0171151 | 2/1986 | European Pat. Off. . |
| 3608292 | 9/1986 | Fed. Rep. of Germany . |
| 1010783 | 11/1965 | United Kingdom . |

Primary Examiner—W. J. Shine

[57] ABSTRACT

$H_2S$ formation by three way catalyst is suppressed by incorporating copper, nickel, manganese or iron oxides into a monolith section downstream of the three way catalyst.

19 Claims, No Drawings

HYDROGEN SULFIDE SUPPRESSING CATALYST SYSTEM USING AN OXIDE OF COPPER, MANGANESE, NICKEL OR IRON

Automobiles seem to insist on producing pollution in some form. Even though three way catalysts are capable of handling unburned hydrocarbons, carbon monoxide and nitrogen oxides, in many cases, these same catalysts convert sulfur in the exhaust into hydrogen sulfide, $H_2S$, noted for its extremely disagreeable "rotten egg" odor. Methods of suppressing formation of $H_2S$ by including cobalt, nickel, iron, manganese or rhenium in the catalytic composition are known, however there is some opinion, particularly in Europe, that cobalt and nickel present potential health problems, so automotive manufacturers are increasingly reluctant to use catalysts containing these metals. In other cases, the net effect of including iron, manganese or rhenium in the catalyst is considered negative by manufacturers even though significant positive effects are obtained by their inclusion. This application is directed to a catalyst system which suppresses formation of $H_2S$ in addition to the three usual pollutants handled by three way catalysts. Advantageously, the catalyst system of the present invention avoids the detrimental interactions experienced in prior art approaches by segregating the $H_2S$ suppressing material in the region downstream of a catalyst providing three way catalytic activity.

The $H_2S$ suppressing material may thus be placed on a downstream portion of a monolith bearing materials having three way catalyst on an upstream portion thereof or the $H_2S$ suppressing material may be placed on a separate monolith placed downstream of a three way catalyst. In these ways, interactions between the three way catalyst and the $H_2S$ suppressing material may be reduced or avoided. This approach can be especially beneficial in two cases wherein it could be impractical to disperse the $H_2S$ controlling material with the three way catalyst. In the first, when pelleted catalysts are used, problems could arise from inclusion of $H_2S$ suppressing material in the pellets due to the tendency of pellets to abrade and be slowly lost in the exhaust stream.

In the second case, when the $H_2S$ controlling material has the potential to severely interact with the three way catalyst components, this interaction is reduced or avoided by placing the $H_2S$ controlling material downstream of the three way catalyst. In the practice of the present invention, oxides of iron, nickel, and manganese are capable of significantly reducing $H_2S$ levels, but it appears that copper is far more active in this regard and that, with relatively small amounts of copper oxide, almost total suppression of $H_2S$ can be obtained, therefore copper is the most highly preferred $H_2S$ controlling material. While there are methods of dispersing copper with the materials providing three way activity, (see for Example U.S. Pat. Nos. 4,675,308; 4,492,770; 3,993,572; and 4,492,769) there is a potential for copper oxide to reduce the activity of the three way catalyst if dispersed therewith. Thus, in a particularly advantageous embodiment of the present invention, copper oxide is dispersed on a section of monolith downstream of a section of monolith bearing materials yielding three way catalytic activity.

DETAILED SUMMARY OF THE INVENTION

In one embodiment, the catalyst system of the present invention will comprise an inlet for receiving an exhaust gas from an internal combustion engine; a duct connected to the inlet for receiving exhaust gas from the inlet; an outlet connected to the duct for receiving and discharging to the atmosphere exhaust gas received from the duct; a three way catalyst located within the duct comprising a first section of refractory monolithic substrate, a particulate gamma alumina support dispersed on the first section of refractory monolithic substrate and catalyst metals chosen from the group consisting of palladium, the combination of platinum plus rhodium, and mixtures of platinum, palladium an rhodium, the catalyst metals being dispersed on the particulate gamma alumina support; and a means for suppressing release of hydrogen sulfide comprising a second section of monolithic refractory substrate having CuO dispersed thereupon in an amount of at least about 0.005 $g/in^3$ of monolith, this means for suppressing release of hydrogen sulfide being disposed within the duct between the three way catalyst and the outlet.

In a preferred embodiment, the means for suppressing release of $H_2S$ will additionally comprise particulate gamma alumina dispersed on the second section of refractory monolithic substrate, the CuO being dispersed on the particulate gamma alumina dispersed on the second section of refractory monolithic substrate.

In a more preferred embodiment, together said first and second sections of refractory monolithic substrate will comprise a single refractory monolithic substrate.

In another preferred embodiment, the first and second sections of refractory monolithic substrate will comprise substantially contiguous nonoverlapping sections of a single refractory monolithic substrate.

In a still more preferred embodiment, the particulate gamma alumina dispersed on the first and second sections of refractory monolithic substrate will be stabilized with a stabilizer chosen from the group consisting of ceria, barium, lanthanum, mixtures of rare earth oxides, and mixtures thereof.

Preferably, the particulate gamma alumina used will have a surface of at least about 50 $m^2/g$, and the refractory monolithic substrate will be comprised of cordierite.

In another preferred embodiment, bulk ceria dispersed on the first section of refractory monolithic substrate will be additionally included in the three way catalyst means.

In another embodiment, the catalyst system will comprise an inlet, an outlet and a three way catalyst for conversion of unburned hydrocarbons, carbon monoxide and oxides of nitrogen disposed between the inlet means and outlet; and hydrogen sulfide suppressing means located between the three way catalyst means and the outlet consisting essentially of a hydrogen sulfide suppressing material dispersed on a monolithic refractory substrate, the hydrogen sulfide suppressing material being chosen from the group consisting of CuO, MnO, NiO and $Fe_3O_4$.

In a more preferred version of this embodiment, the three way catalyst will be dispersed on a portion of the same monolithic refractory substrate that the hydrogen sulfide suppressing material is dispersed upon.

Preferably, the three way catalyst will comprise platinum and rhodium dispersed on a particulate gamma alumina support dispersed on a refractory monolithic substrate.

DESCRIPTION OF THE PREFERRED EMBODIMENTS

The catalyst system of the present invention comprises a three way catalyst in an upstream location and a hydrogen sulfide control device in a downstream location in the exhaust system from an internal combustion engine.

The three way catalysts used in the system of the present invention are conventional and the method of fabrication thereof disclosed in, European Patent Application Nos. 0171151; and 0,119,715; as well as U.S. Pat. Nos. 4,552,733; 4,624,980; 4,678,770; 4,677,095; 4,675,308; 4,440,874; 4,206,087; 4,171,288; 4,171,287; and U.S. patent application Nos. 07/085,903, filed Aug. 13, 1987; 06/879,684, filed June 26, 1986 now U.S. Pat. No. 4,727,052; 06/880,270, filed June 30, 1986, now U.S. Pat. No. 4,714,694.

In general, these catalysts comprise platinum and rhodium dispersed on support particles of a high surface area ceramic oxide, typically gamma aluminum oxide borne on a refractory substrate such as beads, pellets, or a monolithic substrate which may be either a refractory oxide or a high temperature oxidation resistant metal such as Fecralloy or the like. In some cases, three way catalysts may be fabricated using palladium instead of, or in addition to, platinum and rhodium, even though the poison resistance of palladium seems to be somewhat lower than that of platinum.

The $H_2S$ suppressing device used in the catalyst systems of the present invention comprises an $H_2S$ suppressing material chosen from the group consisting of CuO, MnO, NiO and $Fe_3O_4$ dispersed on a monolithic substrate. Advantageously, the $H_2S$ suppressing material may be dispersed on a high surface area support such as gamma alumina or another high surface area catalytically active form of alumina such as eta, theta or delta alumina, which support particles are in turn dispersed on the substrate. Alternatively, particles of $H_2S$ suppressing material may be dispersed directly on a monolith or may be dispersed upon a monolith to which particulate gamma alumina support has been previously applied. The $H_2S$ suppressing material may be applied to a catalyst which already bears catalytic materials but, if so, is preferably applied only to a downstream portion of the completed catalyst so that catalytic activity of the portion to which $H_2S$ suppressing material is not applied may be retained unhindered.

Other methods of preventing or reducing interactions between the $H_2S$ suppressing material and the three way catalyst may be used to provide for a decreased degree of interaction. Notable approaches include applying $H_2S$ suppressing materials to separate particles of gamma alumina and fixing the $H_2S$ suppressing material thereupon either prior to mixing with the platinum group metal bearing particles or prior to applying the particles bearing $H_2S$ suppressing material to the monolith which may be coated with platinum group metal bearing particles before or after the $H_2S$ suppressing material is applied as well as layering or otherwise segregating physically the relative materials.

The $H_2S$ suppressing material may be applied as a dispersion of either the metal or its oxide in powder form in a volatile liquid optionally containing a surfactant to aid in maintaining dispersion or as a soluble salt of the metal or even as particles of some other compound of the metal which may be easily converted to the oxide such as by calcination or the like. In preferred embodiments, the $H_2S$ suppressing material is impregnated upon particulate stabilized gamma alumina by wetting the gamma alumina with an aqueous solution of a soluble salt of the metal to about incipient wetness, drying and calcining lightly to fix the oxide on the gamma alumina. Subsequently, the impregnated gamma alumina is dispersed to form an aqueous slip or gel which is applied to the portion of the monolith which is to bear the $H_2S$ suppressing material. If it is desired to minimize the pressure drop associated with the catalytic system, the $H_2S$ suppressing material will be applied to a downstream fraction, usually less that one-half, more typically from one-third to about one-fifth or one-sixth, of a monolith bearing materials yielding three way catalytic activity upstream of the $H_2S$ suppressing material. In this embodiment, it is often preferred that expensive platinum metals not be applied to the section of the catalyst to bear the $H_2S$ suppressing material as these materials, particularly the most preferred $H_2S$ suppressing material, copper, can interfere with or modify the catalytic activity of the platinum group metals in undesirable ways. Alternatively, portions of monolithic finished catalysts may be dipped in a solution of a soluble salt of hydrogen sulfide suppressing material as, for example, an aqueous solution of copper nitrate may be applied to one quarter of the length of a finished catalyst which is then placed in the exhaust system of an automobile with the copper bearing portion of the monolith downstream of the untreated portion. In heavy duty truck applications, beaded catalysts are often used as three way catalysts. In this application, a monolith bearing nickel oxide or copper oxide dispersed directly or indirectly (as on an alumina support) on a ceramic monolith may advantageously by used downstream of the bed of beaded catalyst to suppress formation of the $H_2S$. In still other applications, a separate, discrete section of monolith bearing the $H_2S$ suppressing material may be used either in the same cannister with the monolith having three way activity or on a separate monolith downstream in a separate cannister.

The total amount of $H_2S$ suppressing material required will vary depending upon the size and maximum speed (rpm) of the engine to which it is to be matched as well as the propensity of the three way catalyst to form $H_2S$. Amounts of as little as about 0.005 grams or 0.25 m-moles of $H_2S$ suppressing materials per cu in of monolith can be effective in suppressing formation of $H_2S$. Typically, a total of about 1.5 grams of $H_2S$ suppressing material may be required for each liter of displacement of an engine which may be operated at speeds of up to about 6000 rpm, the amount required varying approximately in direct proportion to engine size and maximum engine speed.

CuO may be applied throughout the three way catalyst in carefully controlled amounts of from about 0.01 to about 0.04 without unduly degrading the three way activity but it is preferred to prevent deterioration of three way activity by confining the CuO to a downstream portion of the monolith. Sulfided $H_2S$ suppressing material may be regenerated upon exposure to hot lean exhaust gases occurring during operation. The following examples are provided to more fully illustrate the invention which is however limited only by the appended claims.

TWC CATALYST PREPARATION I

Particulate gamma alumina stabilized with 0.8% baria having a surface area of approximately 130 m²/g, deionized water, and acetic acid were added to a ball mill in amounts of 1000 g, 748 and 70 ml respectively, then milled to reduce the particle size to less than 12 microns for 90% (by weight) of the particles.

Separately, ceria having a surface area of greater than about 100 m²/gm is milled at a maximum solids content of about 53–54% by weight until well dispersed, then 254 grams thereof are removed from the mill after adding a small amount of acetic acid.

The ceria and slurry containing about 500 grams of the barium stabilized alumina are combined in a beaker equipped with an overhead stirrer to which 12.14 grams of platinum as chloroplatinic acid are added with vigorous agitation which was continued for 15 to 30 minutes. Hydrogen sulfide is passed through the slurry to fix the platinum, the slurry changing in color from yellow to brown.

The remaining slurry containing about 500 grams of alumina are added to another beaker equipped with an overhead stirrer to which 2.43 g of rhodium as rhodium chloride are added with vigorous agitation which was continued for 15 minutes. Hydrogen sulfide is passed through the slurry to fix the rhodium, this slurry changing in color from peach to brown.

Recycled crushed cordierite monoliths are ball milled at maximum solids (53–54%) until well dispersed, then the platinum containing, rhodium containing and recycle slurries are combined and applied to a monolith in amounts of 1.2 g/in³ of Pt bearing solids, 0.8 g/in³ of rhodium containing solids and 0.175 g/in³ of recycle based on the volume of the monolith. The monolith is dried at 125° C., then optionally calcined at 350° to 450° C. for about an hour.

The resulting catalyst is referred to as TWC-I.

TWC CATALYST PREPARATION II

Unstabilized alumina is impregnated with monoethanolamine platinum hexahydroxide and ceria by combining 600 g of gamma alumina having a surface area of about 150 m²/g, and 500 g of deionized water, milling for about ten minutes, adding 11.75 g of platinum in monoethanolamine platinum hexahydroxide in 125 ml of deionized water, milling for an additional 20 minutes, adding 230 g of ceria having a surface area of about 180 m²/g, diluting 74 g of acetic acid with 175 g of deionized water which is added to the mill, then milling until 90% by weight of the particles are reduced to less than about 9 microns. The resulting slurry of about 51% solids is applied to a monolith to result in a final solids weight gain of about 1.8/in³ after drying at 120° C. for 2 hours and calcination at 400° C. for about 20 minutes.

Unstabilized alumina is impregnated with rhodium and zirconia by combining 600 g of the unstabilized alumina referred to above in this preparation with 4.50 g of rhodium in a 600 ml solution of rhodium nitrate in deionized water and 10 g acetic acid diluted to 30 ml. The admixture is milled for thirty minutes, then 700 g of zirconyl acetate solution containing 20% $ZrO_2$, by weight and 42 g of acetic acid diluted to 125 ml are added to the slurry which is then milled until 90% of the particles by weight are reduced to less than 6 microns. The resulting slurry having a solids content of about 36% by weight is applied to the monolith previously coated above in this preparation to result in an additional final solids weight gain of 0.60 g/in³. The monolith is then dried at 125° C. for 2 hours then calcined at 400° C. for 20 minutes. The apparent solids weight gain of the monolith after calcination at 400° C. will exceed 0.6 g/in³ as zirconyl acetate is not completely decomposed until about 550° C.

The resulting catalyst is referred to as TWC-II.

TWC CATALYST PREPARATION III

TWC beads were prepared by impregnating $Al_2O_3$ beads (5–8 mesh, Alcoa #CSS-105) with 15% ceria, 0.055% Pt and 0.011% Rh. The beads were dried and then calcined @ 500° C. after the $Ce(NO_3)_3$ impregnation and @ 400° C. after impregnation with chloroplatinic acid and rhodium chloride.

H₂S SUPPRESSANT PREPARATION I

Scavenger beads were prepared by impregnating $Al_2O_3$ beads of Catalyst Preparation III with $Ni(NO_3)_2$ or $Mn(NO_3)_2$ solutions, drying, and calcining at 450° C. The scavenger loadings were 2% NiO, 5% NiO or 5% MnO.

H₂S SUPPRESSANT PREPARATION II

Barium stabilized alumina (BSA) was impregnated with the nitrate salt of the indicated metal followed by drying and calcination @ 450° C. to give the oxide. The material (about 230 gm) was then ball-milled with about 260 cc $H_2O$ and 11.5 cc acetic acid for 12 hrs to make a slip. Cores (3"×1.5") were coated, then dried and calcined at 450° C.

TEST PROCEDURE I

The Storage Test for $H_2S$ was carried out by exposing the catalyst to the exhaust of an engine. The latter was operated under fuel-lean (i.e., oxidizing) conditions for approximately 30 minutes, during which time sulfur was stored, presumably as sulfate radicals, on the catalyst surface. The engine was then abruptly switched to fuel-rich (i.e., reducing) conditions, which causes a significant fraction of the stored sulfur to be emitted as $H_2S$. Storage Test results listed below were obtained by the use of Draeger tubes and indicate approximately the time-averaged $H_2S$ concentration in the exhaust gas during the initial 30-second period following the switch from lean to rich engine conditions.

TEST PROCEDURE II

CO and hydrocarbon (HC) light-off temperatures are measured by mounting catalyst monolith bodies in the simulated exhaust gas stream of a laboratory test reactor, the exhaust gas containing 1.0% CO, 0.333% $H_2$, 1.35% $O_2$, 0.04% $C_3H_6$, 0.01% $C_3H_8$, 0.10% NO, 10% $CO_2$, 10% $H_2O$, the balance being $N_2$ at a flow rate of exhaust gas of 54,500 VHSV. As the temperature is raised from 120° C. at a rate of 29° C./min to 430° C., the temperatures required for 50, 75 and 90% conversion respectively, of CO, and for 50, 75 and 90% conversion, respectively, of hydrocarbon are measured.

TEST PROCEDURE III

Catalyst monolith bodies are mounted in the simulated exhaust stream of a laboratory test reactor, the time-averaged exhaust gas containing 0.625% CO, 0.308% $H_2$, 0.61% $O_2$, 0.046% $C_3H_6$, 0.012% $C_3H_8$, 0.116% NO, 16.3% $CO_2$, 10.4% $H_2O$, the balance being $N_2$, the temperature of the exhaust gas being 400° C., the flow rate of the exhaust gas being 54,500 VHSV and the air-to-fuel ratio employed is fluctuated ±0.5 A/F units at 1.0 Hz and 0.5 Hz perturbations while the concentration of unburned hydrocarbons, carbon monoxide and nitrogen oxides in the exhaust stream from each monolith is measured.

CYCLIC AGING PROCEDURE

To simulate use on an engine in the laboratory, a cyclic aging procedure is used in which the catalyst is alternately subjected to 6.4 seconds of rich exhaust conditions then 6.4 seconds of lean exhaust conditions at a specified temperature and a volumetric space velocity of 4000 hr$^{-1}$, the composition of the simulated exhaust gas during the rich portion of the cycle being 2.34% CO, 1.45% H$_2$, 465 ppm NO$_x$, 0.57% O$_2$, balance corresponding to a lambda of 0.96 or an A/F ratio of 14.0 while the composition during the lean portion of the cycle is 0.89% CO, 0.30% H$_2$, 475 ppm NO$_x$, 3% O$_2$, balance N$_2$ corresponding to a lambda of 1.12 or an A/F ratio of 16.3.

EXAMPLE I

Studies of Promoted TWC-I Cores

Information concerning H$_2$S scavengers was obtained via single core studies of TWC-I promoted with MnO, NiO, CuO or Fe$_3$O$_4$. Throughout this specification, it should be understood that the compositions of the oxides of H$_2$S suppressing materials set forth are only nominal and may vary considerably, even cyclically, during the exhaust cycle as the exhaust changes from lean to rich. It is thought that some degree of lability may be needed for these compositions to function to suppress H$_2$S. TWC-I cores (3"×1.5") were dried at 120° F., dessicator-cooled and immersed for 30 sec in a solution containing the appropriate metal nitrate. After removing excess liquid with an air gun, the wet weight was measured and used to calculate the solution pick-up and ultimate metal oxide loading. The impregnated cores were dried at 100° C. and calcined at 400° C. The loadings of the various cores are given in Table I. Two series of cores were prepared. The first was evaluated using Test Procedure I and the second was tested for light-off using Test Procedure II and perturbation using Test Procedure III, both fresh and after cyclic redox aging.

The results of Test Procedure I with the fresh unpromoted and promoted TWC-1 cores are shown in Table II. The unpromoted core released 100 ppm of transition-H$_2$S. CuO, at both levels tested, completed suppressed this. NiO is known to be a effective H$_2$S scavenger, but at a loading of 0.12 g/in$^3$ lowered the H$_2$S emission only to 60 ppm. MnO and Fe$_3$O$_4$ also showed partial suppression. There was a significant difference however, with respect to the influence of loading level. With Fe$_3$O$_4$, loading level was critical, with 0.055 gm/in$^3$ showing no suppression while 0.13 g/in$^3$ released only 10 ppm H$_2$S. In contrast, MnO at both 0.045 and 0.12 g/in$^3$ released 30 ppm H$_2$S.

Table III gives the carbon monoxide and hydrocarbon light-off temperatures, °C., for the virgin unpromoted and promoted TWC-I cores. These tests were carried out at a space velocity of 50,000 hr$^{-1}$ and an air to fuel (A/F) ratio of 15.1. Temperatures required for 50 and 90% conversion are indicated. A significant adverse effect, relative to unpromoted TWC-I, is seen only for CuO at the higher loading level. CO light-off is not affected, but HC light-off data shows an elevated T$_{90}$ value. This points to decreased activity for saturated HC oxidation. Several promoters are seen to have led to significantly decreased light-off temperatures for CO and/or HC on fresh samples.

Perturbation test results using Test Procedure III at an A/F=Stoichiometric±1, volumetric space velocity=50,000 hr$^{-1}$, T=400° C., are shown in Table IV. A clear deactivating effect of CuO is seen. Although CO conversion is not decreased, HC and NOx activities are sharply reduced. It is significant to note, however, that these effects are highly dependent on loading. NOx conversion at 1 Hz is raised from 52 to 90% by reducing the CuO amount from 0.12 to 0.05 gm/in$^3$; HC conversion shows a similar effect. This data points clearly to the need for using a critically controlled amount of CuO for H$_2$S control if CuO is applied to the entire monolith.

Other than CuO, no promotor displayed any adverse effect on the perturbation activity of TWC-I. These cores were then subjected to cyclic redox aging and retested, with results as described below.

Table V shows CO and HC light-off results with TWC-1 cores after cyclic redox aging as specified above (at 850° C., 8 hrs). Test conditions were space velocity SV=50,000 hr$^{-1}$ and A/F=15.1. The most significant result seen is the adverse effect of CuO on HC light-off, specifically saturated HC light-off as reflected in the T$_{90}$ value. Olefin oxidation is not affected, as shown by the T$_{50}$ data. The poor results for core 8 appear anomalous since core 5, with a higher Fe$_3$O$_4$ loading, did not show any decrease in activity as compared with unpromoted F23. Core 2 (0.12 gm/in$^3$ MnO) is missing from Table V as it was not tested.

CO light-off data, shows, somewhat surprisingly, improved activity even after cyclic redox aging. CuO, in particular, lowers light-off temperature with this effect increasing with loading.

Results of the perturbation testing of the cyclic redox aged cores are presented in Table VI. The adverse effects of CuO are similar to those seen with the virgin samples. No activity loss is seen with MnO or NiO, but Fe$_3$O$_4$ at the higher loading (0.13 gm/in$^3$) shows a loss in HC conversion at 1 Hz. Surprisingly, this is barely seen at 0.5 Hz.

To summarize these results, CuO was found to be a potent scavenger of transition H$_2$S at levels greater than 0.05 gm/in$^3$. It produced a clear loss of activity, however, for saturated HC oxidation and NOx reduction. These adverse effects were strongly loading-dependent, suggesting that still-lower loadings of CuO should be explored.

MnO showed good H$_2$S control (70% reduction) at both 0.045 and 0.12 gm/in$^3$. This lack of a loading effect is currently unexplained. Neither loading level affected light-off or perturbation of fresh TWC-I. Only the lower loading was evaluated after cyclic redox aging, with no effect on activity seen.

Fe$_3$O$_4$, at a level of 0.13 gm/in$^3$, showed good H$_2$S scavenging. The only possible adverse effect seen was decreased HC conversion in perturbation testing.

DUAL-BEAD H$_2$S—SCAVENGING STUDIES

Experiments were carried out to assess the feasibility of scavenging H$_2$S from a bed of beaded TWC catalysts for potential applications of heavy trucks and passenger cars.

EXAMPLE II

Test Procedure I Storage Tests were carried out on various mixtures of TWC and scavenger beads. The results are shown in Table VII. There is clear evidence of $H_2S$ - scavenging by $NiO/Al_2O_3$ beads. The reduction in $H_2S$ emission is substantially more than can be accounted for by the decreased amount of TWC beads.

MnO is also seen to be an effective scavenger. Particularly noteworthy is the total elimination of $H_2S$ obtained with the 70% TWC-30% MnO scavenger mixture. If the amount of MnO - containing scavenger beads is decreased to 20%, $H_2S$ emissions rise significantly, indicating contacting between the gas and the scavenger beads is a key factor.

The use of a separate scavenger phase eliminates the problem of harmful interaction with the PM components. Preferred catalyst systems use a scavenger-coated monolith downstream of the TWC beads. An important aspect of this strategy is the reduced particulate emission of the scavenger oxide due to the attrition-resistance of monoliths as compared to beads.

EXAMPLE III

Monoliths were prepared bearing scavengers supported on barium stabilized alumina prepared as described in $H_2S$ Suppressant Preparation I. The finished cores were positioned downstream of TWC-I monoliths in the dual-core Storage Test of Test Procedure I.

Table VIII shows the results. Comparing with Table II, there is agreement with regard to the performance of NiO; i.e., the NiO content for the third entry in Table VIII is 0.14 gm/in$^3$ and this scores about the same as the third entry in Table II, which is 0.12 gm/in$^3$ NiO added via impregnation to the TWC-I core. MnO, however, shows unexpectedly poor performance. Even for a MnO content of 0.11 gm/in$^3$ (Table VIII, second from the bottom) $H_2S$ suppression is feeble, whereas less than half this amount of MnO showed good scavenging activity in Table II. The reason for this discrepancy is not clear. Table VIII also shows excellent scavenging activity for CuO on barium-stabilized alumina in agreement with Table II.

EXAMPLE IV

Further Studies of CuO for $H_2S$ Scavenging

It having been shown that CuO (the working form is probably Cu) is an effective suppressor of transition - $H_2S$, but adversely affects TWC activity, further samples were prepared having reduced amounts of CuO and alternatively restricting CuO to a limited portion of the TWC monolith.

These studies involved $3'' \times 1.5''$ cores of TWC-II. CuO was introduced by immersion in a solution of $Cu(NO_3)_2$. Cores were dried at about 100° C. and dessicator-cooled prior to immersion. In some instances the entire core was immersed while in others CuO was added only to the downstream end.

Two sets of CuO-promoted TWC-II cores were prepared; one for Storage Testing in accordance with Test Procedure I and the other for activity tests as in Test Procedures II and III. For the first set, cores were exposed to air for 15 min. (after removal from the dessicator) before immersion. For the second set, this interval was shortened to less than 5 min. For the first set partial immersion of the core was accomplished as follows. The $Cu(NO_3)_2$ solution was placed in a beaker and the core immersed to the extent of about 2 mm for about 2 sec. It was then withdrawn, excess liquid removed by shaking, and the procedure repeated another two times.

Calculations of the amount of CuO added can be illustrated with the following example. A core was totally immersed in a solution containing 12.78 gm $Cu(NO_3)_2.2.5\ H_2O$ per 200 gm solution. The immersion lasted about 30 sec and after withdrawal the core was air-blown to remove occluded liquid. It was weighed at this point and found to have taken up 9.9 gm solution (i.e., the wet-weight gain was 9.9). Since 200 gm solution contained 12.78 gm $Cu(NO_3)_2.2.5\ H_2O$, this 9.9 gm solution added to the core should contain 0.63 gm $Cu(NO_3)_2.2.5\ H_2O$, which is equivalent to 0.216 gm CuO.

This same solution was used for a partial immersion, using the technique described above. In this case, the wet-weight gain was 2.0 gm. Since total immersion with this solution gave a wet-weight gain of 9.9 gm, it was assumed that the downstream 2.0/9.9 (20%) was "completely immersed" and thus had a loading of 0.041 gm/in$^3$ CuO, while the upstream 80% was unpromoted.

The second set of partially immersed TWC-II samples was prepared via a different procedure. An attempt was made to achieve greater control over the quantity of CuO added. Instead of relying on short contact time between core and solution, a much smaller amount of solution (3 gm) was used. The core was inserted for about 10 sec, withdrawn, and excess liquid shaken out, and the procedure repeated 2-3 times. Following the final contacting, an air-gun was used to remove excess liquid and the wet-weight gain was measured.

Tables IX and X show data pertaining to the preparation of the two sets of CuO-promoted TWC-II. In the first set (Table IX) inspection of core 7 after drying and calcining (all cores were calcined @ 450° C.) showed 1/5 of the basal surface was bare, (i.e., no CuO color). Similar observations were made for cores 5, 6, and 7 in the second set.

As mentioned above, the first set of CuO-promoted TWC-II cores was submitted for Storage Testing in accordance with Test Procedure I. The results are presented in Table XI. Unpromoted TWC-II proved to be a prolific $H_2S$ emitter, scoring greater than 200 ppm. For those samples in which CuO was added to the entire core (2, 3, and 6) it is seen that a CuO loading of only 0.020 gm/in$^3$ reduced transition-$H_2S$ more than 90%, to 20 ppm. Higher loadings gave almost complete suppression.

Cores 4, 5, 7, and 8 contained various loadings of CuO on their downstream ends, ranging from 20 to 30% of their length. It is seen that, in general, downstream loading is effective. For example, a CuO loading of 0.095 gm/in$^3$ need not be applied to the entire core to achieve complete suppression of transition-$H_2S$. The same result is obtained if this loading restricted to 30% of the core with the remainder free of CuO and therefore free of potential poisoning effects. Of course, for sufficiently low loadings one would expect some loss of $H_2S$ scavenging for a partially loaded as compared to a completely loaded core. For example, comparing cores 3 and 4 shows this effect as does a comparison of cores 2 and 5.

Table XII gives the CO and HC light-off temperatures, °C., for the fresh unpromoted and CuO-promoted TWC-II cores. These tests were carried out at a space velocity of 54,500 hr$^{-1}$ and A/F ratio of 15.1. Temperatures required for 50 and 90% conversion are indicated.

In Table III it was seen that adding 0.12 gm/in$^3$ CuO to an TWC-I core raised T$_{90}$ for HC from 355° to 400° C. This adverse effect on saturated HC oxidation was not seen at the lower loading of 0.049 gm/in$^3$. Scanning the last column in Table XII, it appears that a deactivating influence of CuO may be present for cores 3 and 4, although we should expect a significant worsening from 3 to 4 due to the more-than-doubled CuO loading, which is not the case. With regard to the downstream loaded samples, there is a slight elevation of the HC T$_{90}$ values and an even greater increase in the T$_{50}$ values. This latter effect appears to be an artifact. For example, if we compare samples 3 and 6, the data would suggest loading 0.040 gm/in$^3$ on about ⅓th of the core raised T$_{50}$ by 18° C. while the same loading applied to the entire core had no such effect. With regard to CO light-off, some data in Table XII suggest a small amount of deactivation, but these effects do not vary systematically with CuO loading and are therefore suspect.

Perturbation results at $A/F = Stoichiometric \pm 1$, volumetric space velocity SV=54, 500 hr $^{-1}$, T=400° C., are shown in Table XIII. In Table IV it was shown that adding 0.12 gm/in$^3$ CuO to an TWC-I core had no effect on CO conversion but lowered HC conversion (at 1 Hz) from 100 to 77% and NOx conversion from 100 to 52%. Clear effects, although not so severe, were also seen with 0.049 gm/in$^3$: HC and NO$_x$ conversions were 93 and 90%, respectively. The data shown in Table XIII indicate deactivation caused by CuO which, for the total-length-promoted cores, varies systematically with gm/in$^3$ CuO. Note that for the lowest loading, 0.019 gm/in$^3$, no adverse effect is seen. Table XI shows that a similar core (0.020 gm/in$^3$) lowered transition-H$_2$S from greater than 200 ppm to 20 ppm. This suggests the possibility of controlling H$_2$S while maintaining TWC activity with an appropriate level of CuO.

Perhaps even more interesting are the results with the partially loaded cores. As seen in Table XIII, none of these show loss of TWC activity, although, based on Table XI, three of them decreased transition-H$_2$S to less than 25 ppm.

Data presented in this application show that CuO, MnO and Fe$_3$O$_4$ are effective nickel replacements for H$_2$S suppression and warrant further study. CuO is much more effective on a pergram basis even than nickel. At high loadings, Cu detracts from TWC activity; however, there appears to be a "window" of CuO loadings in which good H$_2$S control can be achieved without significantly affecting fresh TWC performance. The technique of downstream-loading of CuO has been shown to be effective and offers the advantage of limiting any TWC deactivation to a discrete zone.

MnO and Fe$_2$O$_3$ can also be effective in reducing emissions of H$_2$S. Despite their lower scavenger efficiency (compared with CuO) they have less effect on TWC performance.

TABLE I

METAL OXIDE LOADINGS USED TO PROMOTE TWC-I

| CORE # | Promotor, gm/in$^3$ | |
|---|---|---|
| | Set 1 | Set 2 |
| 1 | 0* | 0* |
| 2 | 0.12 MnO | 0.12 MnO |
| 3 | 0.12 NiO | 0.12 NiO |
| 4 | 0.12 CuO | 0.12 CuO |
| 5 | 0.13 Fe$_3$O$_4$ | 0.13 Fe$_3$O$_4$ |
| 6 | 0.045 MnO | 0.045 MnO |
| 7 | 0.049 CuO | 0.049 CuO |

*Cores impregnated with H$_2$O

TABLE II

STORAGE TESTING (TEST PROCEDURE I) WITH PROMOTED AND UNPROMOTED TWC-I CORES

| CORE # | PROMOTOR | TRANSITION - H$_2$S (ppm) |
|---|---|---|
| 1 | None | 100 |
| 2 | MnO, 0.12 gm/in$^3$ | 30 |
| 3 | NiO, 0.12 gm/in$^3$ | 60 |
| 4 | CuO, 0.12 gm/in$^3$ | 0,0 |
| 5 | Fe$_3$O$_4$, 0.13 gm/in$^3$ | 10 |
| 6 | MnO, 0.045 gm/in$^3$ | 30 |
| 7 | CuO, 0.049 gm/in$^3$ | 0 |
| 8 | Fe$_3$O$_4$, 0.055 gm/in$^3$ | >100 |

TABLE III

LIGHT-OFF TESTING (TEST PROCEDURE II) OF PROMOTED AND UNPROMOTED TWC-I CORES

| CORE # | PROMOTOR | CO | | HC | |
|---|---|---|---|---|---|
| | | T$_{50}$ | T$_{90}$ | T$_{50}$ | T$_{90}$ |
| 1 | None | 252 | 277 | 273 | 355 |
| 2 | MnO, 0.12 gm/in$^3$ | 246 | 265 | 260 | 352 |
| 3 | NiO, 0.12 gm/in$^3$ | 234 | 250 | 245 | 241 |
| 4 | CuO, 0.12 gm/in$^3$ | 229 | 255 | 280 | 400 |
| 5 | Fe$_3$O$_4$, 0.13 gm/in$^3$ | 234 | 253 | 249 | 329 |
| | | [149 | 163 | 183 | 293]* |
| 6 | MnO, 0.045 gm/in$^3$ | 241 | 272 | 276 | 373 |
| 7 | CuO, 0.049 gm/in$^3$ | 158 | 174 | 186 | 330 |
| 8 | Fe$_3$O$_4$, 0.052 gm/in$^3$ | 230 | 246 | 243 | 329 |

*Repeat test

TABLE IV

PERTURBATION TESTING (TEST PROCEDURE III) OF PROMOTED AND UNPROMOTE TWC-I CORES

| | | % CONVERSION | | | | | |
|---|---|---|---|---|---|---|---|
| | | CO | | HC | | NOx | |
| CORE # | PROMOTER | 1 Hz | 0.5 Hz | 1 Hz | 0.5 Hz | 1 Hz | 0.5 Hz |
| 1 | None | 97 | 97 | 100 | 100 | 100 | 99 |
| 2 | MnO, 0.12 gm/in$^3$ | 98 | 98 | 100 | 100 | 100 | 100 |
| 3 | NiO, 0.12 gm/in$^3$ | 98 | 98 | 100 | 100 | 100 | 100 |
| 4 | CuO, 0.12 gm/in$^3$ | 98 | 98 | 77 | 77 | 52 | 53 |
| 5 | Fe$_3$O$_4$, 0.13 gm/in$^3$ | 64 | 55 | 1 | 0 | 99 | 98 |
| | | [100 | 100 | 98 | 98 | 100 | 100]* |
| 6 | MnO, 0.045 gm/in$^3$ | 99 | 98 | 100 | 100 | 99 | 99 |
| 7 | CuO, 0.049 gm/in$^3$ | 100 | 99 | 93 | 94 | 90 | 91 |
| 8 | Fe$_3$O$_4$, 0.052 gm/in$^3$ | 100 | 100 | 100 | 100 | 100 | 100 |

*Repeat test

TABLE V

LIGHT-OFF TESTING (TEST PROCEDURE II) OF AGED PROMOTED AND UNPROMOTED TWC-I CORES

| CORE # | PROMOTOR | CO $T_{50}$ | CO $T_{90}$ | HC $T_{50}$ | HC $T_{90}$ |
|---|---|---|---|---|---|
| 1 | None | 233 | 253 | 247 | 302 |
| 3 | NiO, 0.12 gm/in$^3$ | 224 | 242 | 236 | 369 |
| 4 | CuO, 0.12 gm/in$^3$ | 153 | 171 | 217 | >400 |
| 5 | Fe$_3$O$_4$, 0.13 gm/in$^3$ | 213 | 229 | 228 | 308 |
| 6 | MnO, 0.045 gm/in$^3$ | 210 | 226 | 225 | 296 |
| 7 | CuO, 0.049 gm/in$^3$ | 196 | 222 | 237 | 393 |
| 8 | Fe$_3$O$_4$, 0.052 gm/in$^3$ | 269 | 287 | 279 | 339 |

TABLE VI

PERTURBATION TESTING (TEST PROCEDURE III) OF AGED PROMOTED AND UNPROMOTED TWC-I CORES

| | | % CONVERSION | | | | | |
|---|---|---|---|---|---|---|---|
| | | CO | | HC | | NOX | |
| CORE # | PROMOTOR | 1 Hz | 0.5 Hz | 1 Hz | 0.5 Hz | 1 Hz | 0.5 Hz |
| 1 | None | 96 | 94 | 100 | 98 | 84 | 82 |
| 3 | NiO, 0.12 gm/in$^3$ | 98 | 96 | 100 | 98 | 96 | 89 |
| 4 | CuO, 0.12 gm/in$^3$ | 100 | 100 | 76 | 76 | 66 | 65 |
| 5 | Fe$_3$O$_4$, 0.13 gm/in$^3$ | 98 | 98 | 95 | 97 | 100 | 100 |
| 6 | MnO, 0.045 gm/in$^3$ | 97 | 97 | 100 | 100 | 96 | 96 |
| 7 | CuO, 0.049 gm/in$^3$ | 98 | 97 | 92 | 91 | 88 | 86 |
| 8 | Fe$_3$O$_4$ 0.052 gm/in$^3$ | 98 | 96 | 100 | 98 | 98 | 88 |

TABLE VII

DUAL-BEAD H$_2$S - SCAVENGER TESTS

| GMS TWC BEADS | SCAVENGER | GMS SCAVENGER BEADS | TRANSITION-H$_2$S, PPM |
|---|---|---|---|
| 100 | NONE | — | 85, 80 |
| 90 | 5% NiO/Al$_2$O$_3$ | 10 | 35, 40 |
| 80 | " | 20 | 10, 50 |
| 70 | " | 30 | 20 |
| 75 | 2% NiO/Al$_2$O$_3$ | 25 | 15 |
| 50 | " | 50 | 0 |
| 80 | 5% MnO/Al$_2$O$_3$ | 20 | 30 |
| 70 | " | 30 | 0, 0 |

TABLE VIII

STORAGE TESTING (TEST PROCEDURE I) OF ALUMINA - SUPPORTED SCAVENGER OXIDES

| SCAVENGER | LOADINGS gm/in$^3$ | TRANSITION-H$_2$S, ppm |
|---|---|---|
| NONE* | — | 100 |
| BSA | 1.3 | 120 |
| 10% NiO/BSA | 1.4 | 40, 65 |
| 10% CuO/BSA | 1.1 | 0, 0 |
| 1.5% MnO/BSA | 1.5 | 60, 85 |
| 3.9% MnO/BSA | 1.2 | 90 |
| 7.8% MnO/BSA | 1.4 | 80 |
| (5% MnO + 5% MgO)/BSA | 1.4 | 95 |

*A blank core was inserted downstream of the TWC-I core
BSA = barium stabilized gamma alumina

TABLE IX

PREPARATION OF CuO - PROMOTED TWC-II CORES: FIRST SET

| CORE # | SOLUTION CONCENTRATION* | WET-WEIGHT GAIN (gm) | CuO LOADING gm/in$^3$ | PERCENT OF CORE PROMOTED WITH CuO |
|---|---|---|---|---|
| 1 | 0 | 9.9 | 0 | — |
| 2 | 6.26 | 10.0 | 0.020 | 100 |
| 3 | 12.78 | 9.9 | 0.041 | 100 |
| 4 | 12.78 | 2.0 | 0.041 | 20 |
| 5 | 6.33 | 2.8 | 0.020 | 28 |
| 6 | 25.57 | 11.3 | 0.093 | 100 |
| 7 | 26.10 | 3.4 | 0.095 | 30 |
| 8 | 50.61 | 2.9 | 0.188+ | 25 |

*Units are gm Cu(NO$_3$)$_2$ 2.5 H$_2$O per 200 gm solution
+It is assumed that the wet-weight gain for complete immersion in this solution would be 11.5 gm. (based on density measurement on slightly less concentrated solution).

TABLE X

PREPARATION OF CuO - PROMOTED TWC-II CORES: SECOND SET

| CORE # | SOLUTION CONCENTRATION* | WET-WEIGHT GAIN (gm) | CuO LOADING gm/in$^3$ | PERCENT OF CORE PROMOTED WITH CuO |
|---|---|---|---|---|
| 1 | No immersion | 0 | — | |
| 2 | 6.26 | 9.6 | 0.019 | 100 |
| 3 | 12.78 | 9.8 | 0.040 | 100 |
| 4 | 25.57 | 10.7 | 0.088 | 100 |
| 5 | 6.26 | 2.9 | 0.019 | 30 |
| 6 | 12.78 | 2.7 | 0.040 | 28 |
| 7 | 25.57 | 1.9 | 0.088 | 18 |

TABLE X-continued
PREPARATION OF CuO - PROMOTED TWC-II CORES: SECOND SET

| CORE # | SOLUTION CONCENTRATION* | WET-WEIGHT GAIN (gm) | CuO LOADING gm/in$^3$ | PERCENT OF CORE PROMOTED WITH CuO |
|---|---|---|---|---|
| 8 | 50.6 | 2.5 | 0.188+ | 22 |

*Units are gm Cu(NO$_3$)$_2$ 2.5 H$_2$O per 200 gm solution
+It is assumed that the wet-weight gain for complete immersion in this solution would be 11.5 gm. (based on density measurement on slightly less concentrated solution).

TABLE XI
STORAGE TESTING (TEST PROCEDURE I) WITH CuO - PROMOTED AND UNPROMOTED TWC-II CORES

| CORE # | CuO PROMOTION, gm/in$^3$ | TRANSITION-H$_2$S, ppm |
|---|---|---|
| 1 | None | >200 |
| 2 | 0.020 on entire core | 20 |
| 3 | 0.041 on entire core | 0 |
| 4 | 0.041 on 20% of core | 25 |
| 5 | 0.020 on 28% of core | 60 |
| 6 | 0.093 on entire core | 0 |
| 7 | 0.095 on 30% of core | 0 |
| 8 | 0.19 on 25% of core | 0 |

TABLE XII
LIGHT-OFF TESTING (TEST PROCEDURE II) OF CuO-PROMOTED AND UNPROMOTED TWC-II CORES

| | | CO | | HC | |
|---|---|---|---|---|---|
| CORE # | CuO PROMOTION, gm/in$^3$ | T$_{50}$ | T$_{90}$ | T$_{50}$ | T$_{90}$ |
| 1 | None | 225 | 249 | 243 | 313 |
| 2 | 0.019 on entire core | 215 | 239 | 233 | 324 |
| 3 | 0.040 on entire core | 209 | 232 | 232 | 347 |
| 4 | 0.088 on entire core | 192 | 211 | 214 | 343 |
| 5 | 0.019 on 30% of core | 248 | 270 | 264 | 320 |
| 6 | 0.040 on 28% of core | 242 | 264 | 261 | 328 |
| 7 | 0.088 on 18% of core | 225 | 258 | 252 | 324 |
| 8 | 0.19 on 22% of core | 234 | 264 | 261 | 333 |

TABLE XIII
PERTURBATION TESTING (TEST PROCEDURE III) OF CuO-PROMOTED AND UNPROMOTED TWC-II CORES

| | | % CONVERSION | | | | | |
|---|---|---|---|---|---|---|---|
| | | CO | | HC | | NOx | |
| CORE # | CuO PROMOTION, gm/in$^3$ | 1 HZ | 0.5 Hz | 1 Hz | 0.5 Hz | 1 Hz | 0.5 Hz |
| 1 | None | 98 | 97 | 100 | 100 | 99 | 100 |
| 2 | 0.019 on entire core | 98 | 98 | 100 | 100 | 100 | 97 |
| 3 | 0.040 on entire core | 98 | 98 | 97 | 97 | 93 | 93 |
| 4 | 0.088 on entire core | 98 | 98 | 93 | 93 | 77 | 75 |
| 5 | 0.019 on 30% of core | 97 | 97 | 100 | 100 | 100 | 100 |
| 6 | 0.040 on 28% of core | 98 | 98 | 100 | 100 | 99 | 99 |
| 7 | 0.088 on 18% of core | 98 | 98 | 100 | 100 | 99 | 98 |
| 8 | 0.19 on 22% of core | 98 | 98 | 100 | 100 | 99 | 100 |

As our invention, we claim:

1. A catalyst system comprising:
inlet means for receiving an exhaust gas from an internal combustion engine; duct means operably connected to said inlet means for receiving exhaust gas from said inlet means; outlet means operably connected to said duct means for receiving and discharging to the atmosphere exhaust gas received from said duct means; three way catalyst means located within said duct means comprising a first section of refractory monolithic substrate, a particulate gamma alumina support dispersed on said first section of refractory monolithic substrate and catalyst metals chosen from the group consisting of palladium, the combination of platinum plus rhodium, and mixtures of platinum, palladium and rhodium, said catalyst metals being dispersed on said particulate gamma alumina support; and means for suppressing release of hydrogen sulfide comprising a second section of monolithic refractory substrate having CuO dispersed thereupon in an amount of at least about 0.005 g/in$^3$ of monolith, said means for suppressing release of hydrogen sulfide being disposed within said duct means between said three way catalyst means and said outlet means.

2. The catalyst system of claim 1, wherein said means for suppressing release of H$_2$S additionally comprises particulate gamma alumina dispersed on said second section of refractory monolithic substrate, said CuO being dispersed on said particulate gamma alumina dispersed on said second section of refractory monolithic substrate.

3. The catalyst system of claim 2, wherein together said first and second sections of refractory monolithic substrate comprise a single refractory monolithic substrate.

4. The catalyst system of claim 2 wherein said first and second sections of refractory monolithic substrate comprise substantially contiguous nonoverlapping sections of a single refractory monolithic substrate.

5. The catalyst system of claim 2 wherein said particulate gamma alumina dispersed on said first and second sections of refractory monolithic substrate are stabilized with a stabilizer chosen from the group consisting of ceria, barium, lanthanum, mixtures of rare earth oxides, and mixtures thereof.

6. The catalyst system of claim 5 wherein said particulate gamma alumina has a surface area of at least about 50 m$^2$/g.

7. The catalyst system of claim 6, wherein said first and second sections of refractory monolithic substrate are comprised of cordierite.

8. The catalyst system of claim 7 wherein bulk ceria dispersed on said first section of refractory monolithic substrate is additionally included in said three way catalyst means.

9. The catalyst system of claim 8 wherein together said first and second sections of refractory monolithic substrate comprise a single refractory monolithic substrate.

10. The catalyst system of claim 9 wherein said first and second sections of refractory monolithic substrate comprise substantially contiguous nonoverlapping sections of a single refractory monolithic substrate.

11. A catalyst system comprising:
inlet means for receiving exhaust gas from an internal combustion engine;
duct means operably connected to said inlet means for receiving exhaust gas from said inlet means;
outlet means operably connected to said duct means for receiving and discharging to the atmosphere exhaust gas received from said duct means;
three way catalyst for internal combustion engine exhaust means for conversion of unburned hydrocarbons, carbon monoxide and oxides of nitrogen disposed in said duct means between said inlet means and said outlet means; and hydrogen sulfide suppressing means located between said three way catalyst means and said outlet means consisting essentially of a hydrogen sulfide suppressing material dispersed on a monolithic refractory substrate, said hydrogen sulfide suppressing material being chosen from the group consisting of oxides of CuO, MnO, NiO and $Fe_3O_4$.

12. The catalyst system of claim 11 additionally comprising particulate gamma alumina dispersed on said monolithic refractory substrate, wherein said hydrogen sulfide suppressing material is dispersed on said particulate gamma alumina.

13. The catalyst system of claim 12 wherein said hydrogen sulfide suppressing material is CuO.

14. The catalyst system of claim 12 wherein said hydrogen sulfide suppressing material is NiO.

15. The catalyst system of claim 11 wherein said three way catalyst means is dispersed on a portion of the same monolithic refractory substrate that said hydrogen sulfide suppressing material is dispersed upon.

16. The catalyst system of claim 15 wherein said three way catalyst comprises platinum and rhodium dispersed on a particulate gamma alumina support dispersed on said refractory monolithic substrate.

17. The catalyst system of claim 11 wherein the internal combustion engine is maintainable at substantially stoichiometric conditions.

18. The catalyst system of claim 11 wherein the refractory substrate is ceramic.

19. The catalyst system of claim 17 wherein the refractory substrate is ceramic.

* * * * *